United States Patent
Trinschek et al.

(10) Patent No.: US 9,192,012 B2
(45) Date of Patent: Nov. 17, 2015

(54) DIMMABLE LED READING LIGHT UNIT, ARRANGEMENT OF POWER SUPPLY AND DIMMABLE LED READING LIGHT UNIT, METHOD OF OPERATING A DIMMABLE LED READING LIGHT UNIT IN A POWER SUPPLY SYSTEM, AND METHOD OF REPLACING A DIMMABLE LIGHT UNIT BY A DIMMABLE LED READING LIGHT UNIT

(71) Applicant: Goodrich Lighting Systems GmbH, Lippstadt (DE)

(72) Inventors: Robert Trinschek, Hamm (DE); Tomasz Kordecki, Hamm (DE); Frederik Kraemer, Erwitte (DE)

(73) Assignee: GOODRICH LIGHTING SYSTEMS GMBH (DE)

( * ) Notice: Subject to any disclaimer, the term of this patent is extended or adjusted under 35 U.S.C. 154(b) by 0 days.

(21) Appl. No.: 14/200,841

(22) Filed: Mar. 7, 2014

(65) Prior Publication Data
US 2014/0252952 A1    Sep. 11, 2014

(30) Foreign Application Priority Data
Mar. 7, 2013   (EP) ..................................... 13158101

(51) Int. Cl.
| | |
|---|---|
| *B60Q 1/14* | (2006.01) |
| *H05B 33/08* | (2006.01) |
| *B60Q 3/00* | (2006.01) |
| *H05B 39/04* | (2006.01) |

(52) U.S. Cl.
CPC .............. *H05B 33/0848* (2013.01); *B60Q 3/00* (2013.01); *H05B 33/0803* (2013.01); *H05B 33/0845* (2013.01); *H05B 33/0851* (2013.01); *H05B 39/041* (2013.01); *H05B 39/047* (2013.01); *Y02B 20/383* (2013.01)

(58) Field of Classification Search
USPC ........... 315/77, 291, 307, 308; 307/10.1, 10.8
See application file for complete search history.

(56) References Cited

U.S. PATENT DOCUMENTS

| | | | |
|---|---|---|---|
| 6,724,158 B1 | 4/2004 | Feldman | |
| 8,183,790 B2 * | 5/2012 | Roebke | 315/291 |
| 8,339,070 B2 * | 12/2012 | Lai | 315/311 |
| 8,547,017 B2 * | 10/2013 | Salter et al. | 315/77 |
| 2009/0267538 A1 * | 10/2009 | Mantovani | 315/297 |

OTHER PUBLICATIONS

Extended European Search Report for Application No. 13158101.9-1802; Date of mailing Aug. 27, 2013. 6 pages.

* cited by examiner

*Primary Examiner* — Thuy Vinh Tran
(74) *Attorney, Agent, or Firm* — Cantor Colburn LLP

(57) ABSTRACT

A dimmable LED reading light unit, in particular for a passenger transportation vehicle, such as an airplane, a bus or a ship, comprises an input which is connectable to a potentiometer that outputs a direct voltage having a voltage intensity corresponding to a selected potentiometer position; a load current source being configured to generate a predetermined load current; a current controller providing an operating current for operating at least one LED; and an electronic measuring and control unit; wherein the load current source and the current controller are connected to the input in parallel.

11 Claims, 3 Drawing Sheets

DIMMABLE LED READING LIGHT UNIT, ARRANGEMENT OF POWER SUPPLY AND DIMMABLE LED READING LIGHT UNIT, METHOD OF OPERATING A DIMMABLE LED READING LIGHT UNIT IN A POWER SUPPLY SYSTEM, AND METHOD OF REPLACING A DIMMABLE LIGHT UNIT BY A DIMMABLE LED READING LIGHT UNIT

CROSS REFERENCE TO RELATED APPLICATIONS

This application claims priority to European Patent Application No. 13 158 101.9 filed Mar. 7, 2013, the entire contents of which is incorporated herein by reference.

The invention relates to interior lighting systems for a passenger transportation vehicle such as an airplane, a ship, a bus, or a railcar and, in particular a dimmable LED reading light unit for such passenger transportation vehicle.

In passenger transportation vehicles, such as an airplane, a ship, a bus, or a railcar, halogen lights have been used as reading lights or seat lights. Due to their limited light yield and their comparably high power consumption, there is a tendency of replacing existing halogen lights by modern LED lights that have a higher light yield and a lower power consumption.

However, in many cases it is not possible to adapt the existing power supply units in such passenger transportation vehicles, for example in airplanes, to the changed needs of LEDs that a replacement of a halogen light by a LED light brings with it. Such adaptation would be costly and cumbersome.

Further, the functionality of the light to be capable of being dimmed in order to emit light with a selected light intensity must be maintained.

Accordingly, it would be beneficial to provide a dimmable LED reading light unit having a high efficiency and being capable of replacing a conventional light unit. Further, it would be beneficial to facilitate the replacement of a conventional light unit by a dimmable LED reading light unit as much as possible while replacing as little parts as possible and without changing the power supply unit.

SUMMARY

Exemplary embodiments of the invention include a dimmable LED reading light unit, in particular for a passenger transportation vehicle, such as an airplane, a bus or a ship, comprising an input which is connectable to a potentiometer that outputs a direct voltage having a voltage intensity corresponding to a selected potentiometer position; a load current source being configured to generate a predetermined load current; a current controller providing an operating current for operating at least one LED; and an electronic measuring and control unit; wherein the load current source and the current controller are connected to the input in parallel; wherein the electronic measuring and control unit is configured to measure the voltage when no load current is generated by the load current source; to drive the load current source to generate a predetermined load current and to measure the voltage when the predetermined load current is generated; to determine the position of the potentiometer, based on the measured voltages, based on the load current, and based on a predetermined nominal resistance value of the potentiometer; and to control the current controller to supply driving current to the at least one LED necessary to emit light with a luminous flux corresponding to the position of the potentiometer.

Exemplary embodiments of the invention further include an arrangement of a power supply and a dimmable LED reading light unit for use in a passenger transportation vehicle, such as an airplane, a bus or a ship; wherein the dimmable LED reading light unit is a dimmable LED reading light unit as explained above; and wherein the input of the potentiometer is connected to a first power supply line of the power supply unit and the output of the dimmable LED reading light unit is connected to a second power supply line of the power supply unit.

Exemplary embodiments of the invention further include a method of operating a dimmable LED reading light unit in a power supply system, in particular of a passenger transportation vehicle, such as an airplane, a ship, a bus, or a railcar, comprising the steps of:
  (a) supplying a potentiometer as well as a load current source and a current controller connected in parallel to each other and connected in series to the potentiometer with a constant supply voltage;
  (b) selecting a potentiometer position;
  (c) measuring the voltage, by an electronic measuring and control unit, when no load current is generated by the load current source;
  (d) driving the load current source to generate a predetermined load current and measuring the voltage, by the electronic measuring and control unit, when the predetermined load current is generated;
  (e) determining the position of the potentiometer, based on the measured voltages, based on the load current, and based on a predetermined nominal resistance value of the potentiometer; and
  (f) controlling the current controller, by the electronic measuring and control unit, to supply driving current to at least one LED necessary to emit light with a luminous flux corresponding to the position of the potentiometer.

Exemplary embodiments of the invention further include a method of replacing a dimmable light unit, in particular a dimmable halogen light unit, in a power supply system, in particular of a passenger transportation vehicle, such as an airplane, a bus or a ship, by a dimmable LED reading light unit as explained above, the method comprising the steps of: disconnecting the dimmable halogen light unit from the potentiometer and from the ground line of the power supply system; and connecting the output line of the potentiometer to the input of the dimmable LED reading light unit and connecting the output of the dimmable LED reading light unit to the ground line of the power supply system.

The dimmable LED reading light unit, according to exemplary embodiments of the invention, has a higher light yield and requires less electrical power as compared to conventional halogen light units. Furthermore, the dimmable LED reading light unit requires only very little maintenance since its elements normally have a long lifetime. Therefore, significant costs savings in the operation and the maintenance of the dimmable LED reading light unit can be realized.

By the dimmable LED reading light unit, according to exemplary embodiments of the invention, existing light units, particularly existing halogen light units can be replaced quickly, easily and reliably without having to change the wiring of the system and without having to change the potentiometer. The potentiometer can be kept and used for dimming the LED reading light unit which increases the cost savings and reduces the effort and costs associated with the replacement.

The dimmable LED reading light unit can be operated and dimmed reliably by using only one wire, namely the line coming from the potentiometer output supplying direct voltage and the ground line.

Moreover, the power supply that normally supplies a constant voltage of at least 20 VDC, for example 28 VDC can be used and the entire dimming range for the dimmable LED reading light unit between 100%, corresponding to an off state of the LED(s) and to the 100% resistance value of the potentiometer, and 0%, corresponding to the full luminous flux of the LED(s) and to a minimum, particularly 0% resistance value of the potentiometer, can be achieved.

The resistance value of the potentiometer at the selected potentiometer position can be determined using the following formula:

$$R_{pot} = \Delta U / \Delta I,$$

with $\Delta I$ being the load current generated by the load current source which corresponds to the difference in current between times when the load current source generates no load current (off state) and when it generates a predetermined load current (load current generating state), and with $\Delta U$ being the difference between the voltage measurements at such times, such difference corresponding to the voltage drop at the potentiometer.

The potentiometer position can then be determined using the following formula:

Potentiometer position=resistance value at selected potentiometer position $R_{pot}$/maximum resistance value of potentiometer $R_{max}$ The inventors have found that the additional load current causes a voltage drop at the potentiometer, which voltage drop is proportional to the position/dimming rate of the potentiometer. This enables a determination of the resistance value of the potentiometer and of the potentiometer position. If the additional load current is known, then no current measurement is necessary.

By a dimmable LED reading light unit or a dimmable LED seat light unit, according to exemplary embodiments of the invention, also dimmable LED light units are to be understood that emit light with an intensity of illumination suitable for reading, no matter if such dimmable LED light units are in fact used for reading.

According to a first embodiment, the dimmable LED reading light unit further comprises at least one LED connected to the current controller.

According to a further embodiment, two or more LEDs connected to the current controller, particularly connected in series to the current controller, are provided. By such embodiment the amount of visible light emitted can be increased.

According to a further embodiment, the electronic measuring and control unit is configured to periodically switch the load current source between a load current generating state in which the load current source generates a load current and an off-state in which the load current source generates no load current. By this embodiment changing positions of the potentiometer are identified quickly and the driving current generated by the current controller can be adapted quickly and reliably to changing potentiometer positions.

According to a further embodiment, the current controller comprises a controlled current source or a transistor.

According to a further embodiment, the current controller is configured to supply driving current to the at least one LED necessary to emit light with a luminous flux corresponding to the determined potentiometer position of the potentiometer by pulse width modulation. In this embodiment, the intensity of the driving current does not have to be modified. Rather, the duty factor or in other words the ratio between the on times and off times is adapted such that the at least one LED emits light with a luminous flux corresponding to the determined potentiometer position of the potentiometer.

According to an alternative embodiment, the current controller is configured to supply the driving current to the at least one LED necessary to emit light with a luminous flux corresponding to the determined potentiometer position of the potentiometer by supplying driving current with a current intensity corresponding to the determined potentiometer position of the potentiometer. This is also called linear LED control.

According to a further embodiment, the dimmable LED reading light unit further comprises an output connectible to a ground line of the power supply system.

According to a further embodiment the dimmable LED reading light unit further comprises a housing enclosing the elements of the dimmable LED reading light unit, particularly the load current source, the current controller, and the electronic measuring and control unit, and fastening the LED/the plurality of LEDs.

According to a further embodiment the dimmable LED reading light unit comprises a potentiometer having an input being connectible to a power supply unit supplying a substantially constant direct voltage. In this embodiment, the potentiometer is part of the dimmable LED reading light unit itself and can be also enclosed in the housing, if present.

For the arrangement of a power supply and a dimmable LED reading light for use in a passenger transportation vehicle, according to exemplary embodiments of the invention, for the method of operating a dimmable LED reading light unit in a power supply system, according to exemplary embodiments of the invention, and for the method of replacing a dimmable light unit in a power supply system by a dimmable LED reading light unit, according to exemplary embodiments of the invention, the same advantages and embodiments as explained with respect to the dimmable LED reading light unit apply, and they are herewith incorporated by reference without repeating them again for brevity.

The invention also relates to a passenger transportation vehicle, such as an airplane, a ship, a bus, or a railcar, comprising a dimmable LED reading light unit as described herein or comprising an arrangement of a power supply and of a dimmable LED reading light unit as described herein. The same advantages and embodiments as explained with respect to the dimmable LED reading light unit and with respect to the arrangement of a power supply and of a dimmable LED reading light unit also apply for the whole passenger transportation vehicle, and they are herewith incorporated by reference without repeating them again for brevity.

BRIEF DESCRIPTION OF THE DRAWINGS

Embodiments of the invention are described in greater detail below with reference to the figures, wherein.

DETAILED DESCRIPTION

Figure 1:
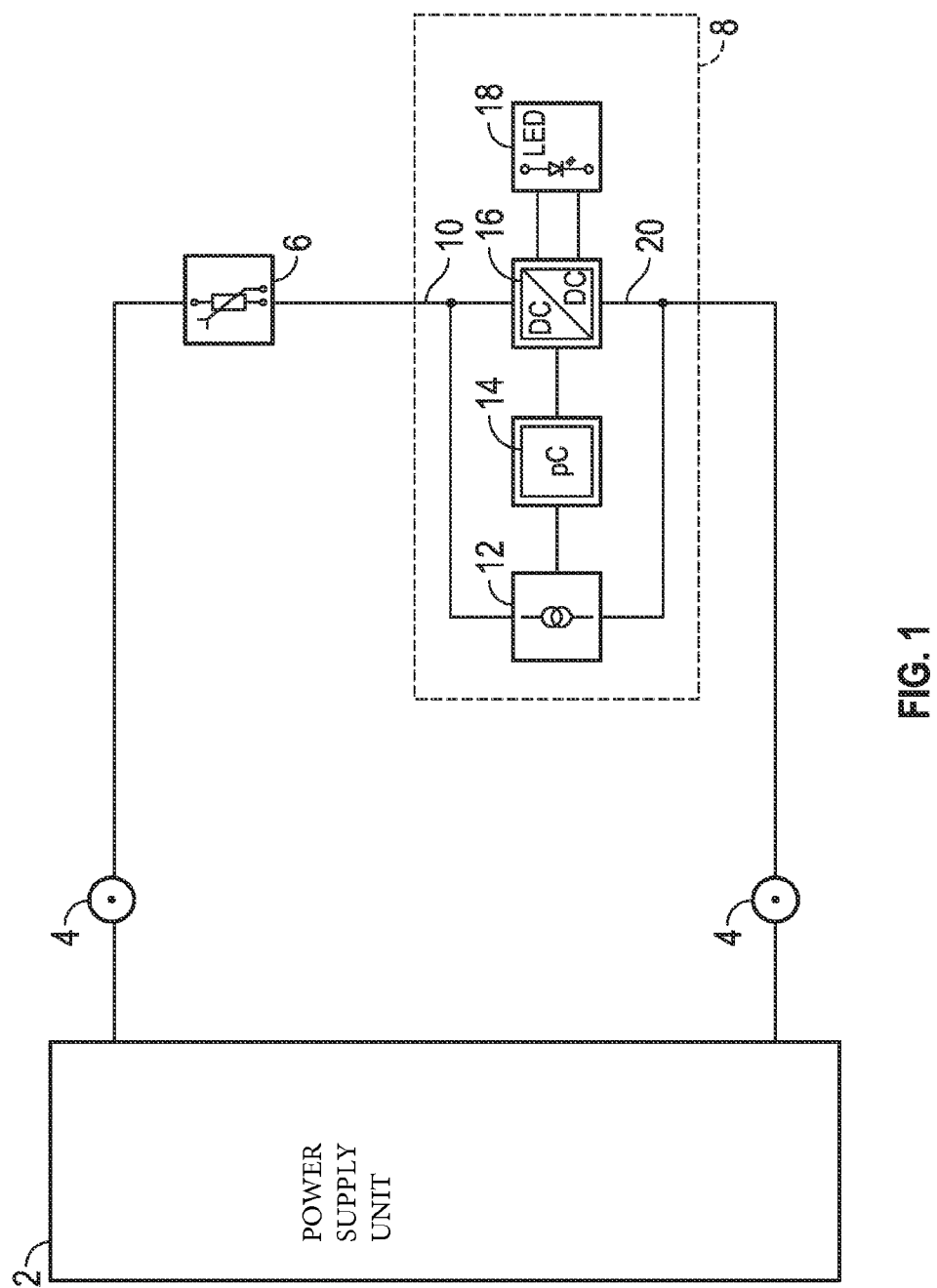
FIG. 1 is a schematic diagram of a power supply unit of an airplane and a dimmable LED reading light unit, according to an exemplary embodiment of the present invention.

FIG. 1 shows, according to an exemplary embodiment of the present invention, a schematic diagram of a power supply unit 2 to which a potentiometer 6 and a dimmable LED reading light unit 8 are connected via power supply connections 4.

The power supply unit 2 provides a direct voltage, which is substantially constant and which can be for example 28 VDC, over the power supply connections 4. One or more reading light units of an airplane and other components disposed in a so-called passenger service unit PSU can be connected to the power supply connections 4. The power supply unit 2 is sometimes also called "the passenger interface and supply adapter" PISA.

In the present embodiment, for simplicity, only one reading light unit that is connected to the power supply unit 2 via the power supply connection 4 is shown. This reading light unit is formed as a dimmable LED reading light unit 8 having a potentiometer 6 connected in series and in front thereof.

Via the upper power supply connection 4, a substantially constant voltage of for example 28 VDC is supplied and the lower power supply connection 4 forms a ground line.

In FIG. 1, a halogen light unit (not shown) has been replaced by the dimmable LED reading light unit 8, wherein the potentiometer 6 of the halogen light unit has not been replaced but rather kept in order to keep the effort and costs for the replacement as low as possible and in order to be able to continue to use the potentiometer 6 for dimming.

For replacing the halogen light unit by the dimmable LED reading light unit 8, it is only required to connect the connection line coming from the output of the potentiometer 6 to the input of the dimmable LED reading light unit 8 and to connect the output of the dimmable LED reading light unit 8 to the ground line 4, and no other changes in the wiring have to be made.

Due to their different characteristics, LED lights could not be dimmed by potentiometers connected in series thereof, until the present invention has been made.

The dimmable LED reading light unit 8 comprises an input 10 that is connected to the potentiometer 6, a load current source 12 and a current controller 16 connected in parallel, an electric measuring and control unit 14 and one LED 18 or a plurality of LEDs 18, and an output 20 connected to the ground line 4. The electronic measuring and control unit 14 can be for example a microcontroller. The current controller 16 can also be called direct current converting unit. In the embodiment of FIG. 1, schematically only one LED 18 is depicted, however it is to be understood that instead of one LED 18 also a plurality of LEDs 18 connected in series or in parallel can be provided and can be controlled as described herein.

The potentiometer 6 outputs a direct voltage having a voltage intensity corresponding to a potentiometer position selected, for example by a passenger, a cabin attendant or a pilot.

The load current source 12 is configured to generate a predetermined load current of for example 50 mA and to be switched between an off state where no load current is generated and a load current generating state where the predetermined load current is generated. This additional load current causes a voltage drop at the potentiometer 6, which voltage drop is proportional to the position/dimming rate of the potentiometer 6.

In one embodiment, the electronic measuring and control unit 14 controls the load current source 12 such that it switches alternatingly between the off state and the load current generating state.

Further, the electronic measuring and control unit 14 is configured to measure the voltage, especially the voltage during the off state of the load current source 12, when no current flows through the load current source 12 and during the load current generating state when the predetermined current flows through the load current source 12.

Based on the measurements of the voltage both during the off state and the load current generating state of the load current source 12, the voltage drop at the potentiometer 6 can be determined. Based on such voltage drop and the knowledge of the predetermined current, the actual resistance value of the potentiometer 6 can be determined. Further, when also the maximum resistance value of the potentiometer 6 corresponding to a maximum 100% dimming position is known, the potentiometer position can be determined.

Depending on the position of the potentiometer 6 determined that way the electronic measuring and control unit 14 controls the current controller 16 to supply driving current to the LED 18 being necessary to emit light with an intensity of illumination corresponding to the determined potentiometer position of the potentiometer 6.

By the dimmable LED reading light unit 8 and in particular by the load current source 12 and the electronic measuring and control unit 14, the position/dimming rate of the potentiometer 6 can be determined quickly, easily and reliably, and based on such determined potentiometer position, the LED 18 can be driven by the current controller 16 such that this LED 18 emits light with a light intensity corresponding to the selected potentiometer position.

This can be achieved in practice either by adjusting the intensity of the driving current by the current controller 16 or by changing the duty cycle of the driving current for the LED 18, as will be explained in further detail below.

It has to be mentioned, that the dimmable LED reading light unit 8, and in particular the load current source 12 and the electronic measuring and control unit 14 can determine the position/dimming rate of potentiometer 6 independently from the intensity of the voltage applied by the power supply unit 2 through the power supply connections 4.

In practice, the dimmable LED reading light unit 8 comprises a housing with only one input 10 and one output 20 and an existing halogen light unit can easily be replaced by taking out the halogen light unit, for example from its location at the inner ceiling of an airplane, by inserting the dimmable LED reading light unit 8, by connecting the single line coming from the potentiometer 6 to the input 10 and by connecting the output 20 to the ground line 4.

Therefore, an efficient and low maintenance LED reading light unit 8 is attained which can be installed easily without having to change the wiring of the system. Further, the present potentiometer 6 can be kept and still be used.

Figure 2:
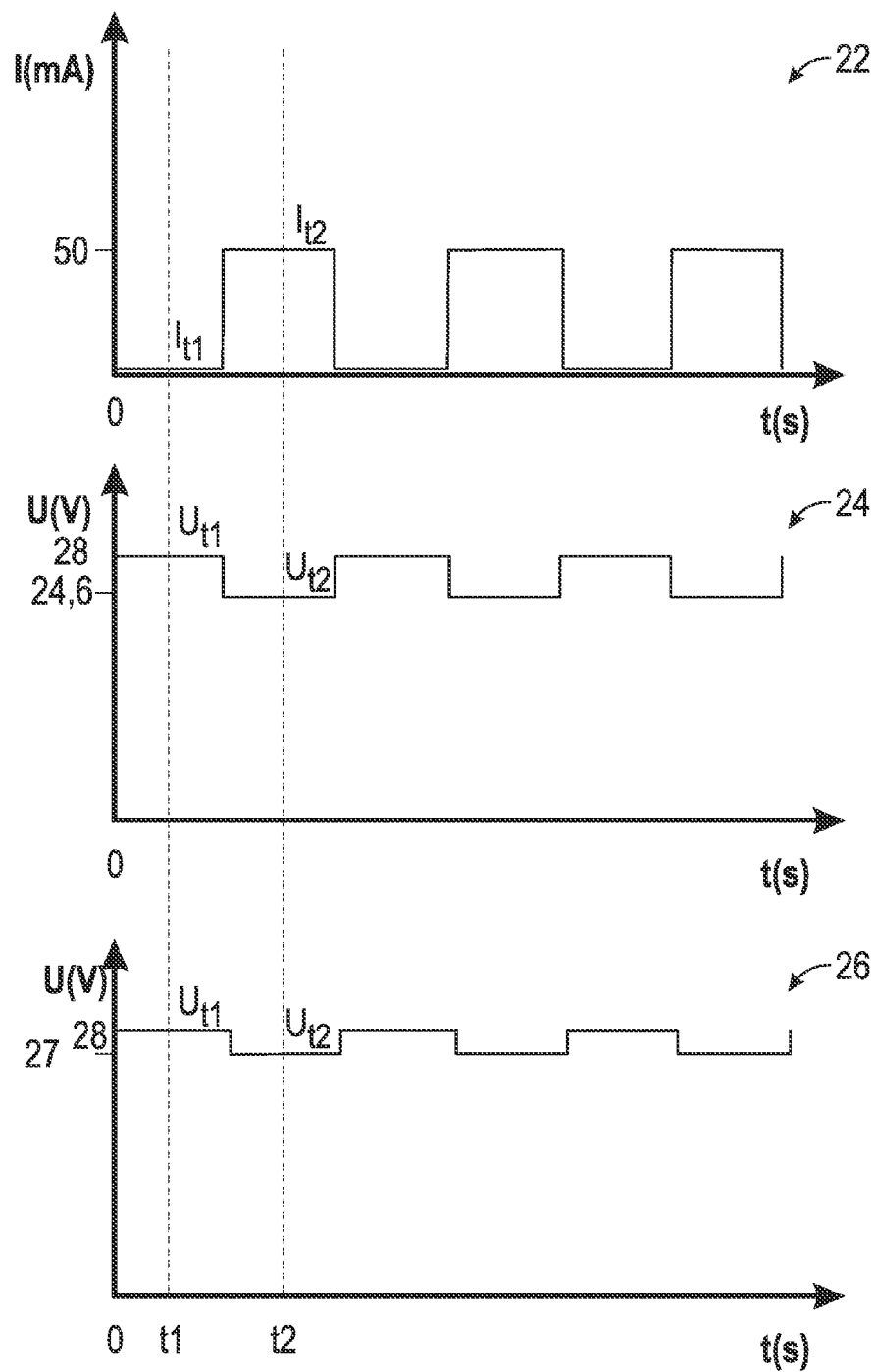
FIG. 2 depicts a first diagram showing the course of a load current over time, a second diagram showing the course of a first voltage over time, and a third diagram depicting the course of a second voltage over time.

In the load current over time diagram 22 of FIG. 2, an exemplary course of the load current generated by the load current source 12 over time is shown. As it can be seen, the load current source 12 alternatingly generates no load current (off state) and a predetermined load current of 50 mA (load current generating state).

The first voltage over time diagram 24 and the second voltage over time diagram 26 of FIG. 2 show, at different positions of the potentiometer 6, the respective courses of the voltage measured by the electronic measuring and control unit 14 at points in time corresponding to points in time in the load current over time diagram 22.

At a first point in time t1, the current value $I_{t1}=0$ mA is depicted in the load current over time diagram 22 and measured voltage values $U_{t1}$ of 28V are depicted in the first voltage over time diagram 24 and the second voltage over time diagram 26.

Likewise, at a second point in time t2, the current value $I_{t2}=50$ mA is depicted in the load current over time diagram 22 and measured voltage values $U_{t2}$ of 24.6V and, respectively, 27 V are depicted in the first voltage over time diagram 24 and the second voltage over time diagram 26.

The first voltage over time diagram 24 and the second voltage over time diagram 26 show examples of calculation, where it is assumed for simplicity that there is no operating current of the current controller 16 and the LED 18. Since no current flows in the off state periods when no load current is generated by the load current source 12, then there is no voltage drop at the potentiometer 6 in such off state periods.

In the first voltage over time diagram 24, the potentiometer 6 is in a first exemplary dimming position has been selected, for example by a passenger, by a flight attendant, or by a pilot.

The voltage measured by the electronic measuring and control unit 14 changes between 28 V, when the load current source 12 generates no load current and there is no voltage drop at the potentiometer 6, and 24.6 V when the load current source 12 generates the predetermined load current of 50 mA.

In the second voltage over time diagram 26 the potentiometer 6 is in a second exemplary position that has been selected, for example by a passenger, by a flight attendant, or by a pilot.

The voltage measured by the electronic measuring and control unit 14 changes between 28 V, when the load current source 12 generates no load current and there is no voltage drop at the potentiometer 6, and 27 V, when the load current source 12 generates the predetermined load current of 50 mA.

The maximum nominal resistance value of the potentiometer 6 at the 100% maximum dimming position is known to the electronic measuring and control unit 14 and is in the exemplary embodiment 68Ω.

According to the first voltage over time diagram 24, the voltage drop at the potentiometer 6 in its maximum dimming position is 28 V−24.6 V=3.4 V. According to the second voltage over time diagram 26, the voltage drop at the potentiometer 6 in its exemplary dimming position is 28 V−27 V=1 V.

According to the formula, $$\text{resistance of potentiometer } R_{pot} = \Delta U/\Delta I,$$

(with only absolute values being regarded) the resistance value of the potentiometer 6 can be calculated to be:

$$R_{pot} = \Delta U/\Delta I = (U_{t1}-U_{t2})/(I_{t1}-I_{t2}) = 3.4\ V/50\ mA = 68\Omega$$

in the example of the first voltage over time diagram 24.

Hence, the potentiometer position can be determined to be: 68Ω/68Ω=100%, hence the potentiometer 6 is in its 100% maximum dimming position.

Likewise, the resistance value of the potentiometer 6 can be calculated to be:

$$R_{pot} = \Delta U/\Delta I = 1.0\ V/50\ mA = 20\Omega$$

in the example of the second voltage over time diagram 26.

Hence, the potentiometer position can be determined to be: 20Ω/68Ω=29%.

With the selected position of the potentiometer 6 determined that way, the electronic measuring and control unit 14 controls the current controller 16 to drive the LED 18 to emit light with an intensity corresponding to a potentiometer position of 100%, such that the LED(s) are in their off state, in the first example of the first voltage over time diagram 24, and corresponding to a potentiometer position of 29%, in the second example of the second voltage over time diagram 24.

In alternative examples, where there is an operating current of the current controller 16 and the LED 18, the current in the load current over time diagram changes between the operating current of the current controller 16 and the LED 18, for example 5 mA, and a value corresponding to the sum of the operating current of the current controller 16 and the LED 18 and the predetermined load current of 50 mA generated by the load current source 12, for example 5 mA+50 mA=55 mA. In such case, the corresponding voltage, in the 100% maximum dimming potentiometer position of the first voltage over time diagram 24, would change between 28 V−(68Ω*5 mA)=28V−0.34V=27.64 V and 27.64 V−3.4 V=24.24 V. Likewise, the corresponding voltage, in the potentiometer position in the example of the second voltage over time diagram 26, would change between 28 V−(20Ω*5 mA)=28V−0.1V=27.9 V and 27.9 V−1.0 V=26.9 V.

The remaining calculation steps correspond to those explained above, and they will not be repeated for brevity.

Figure 3:
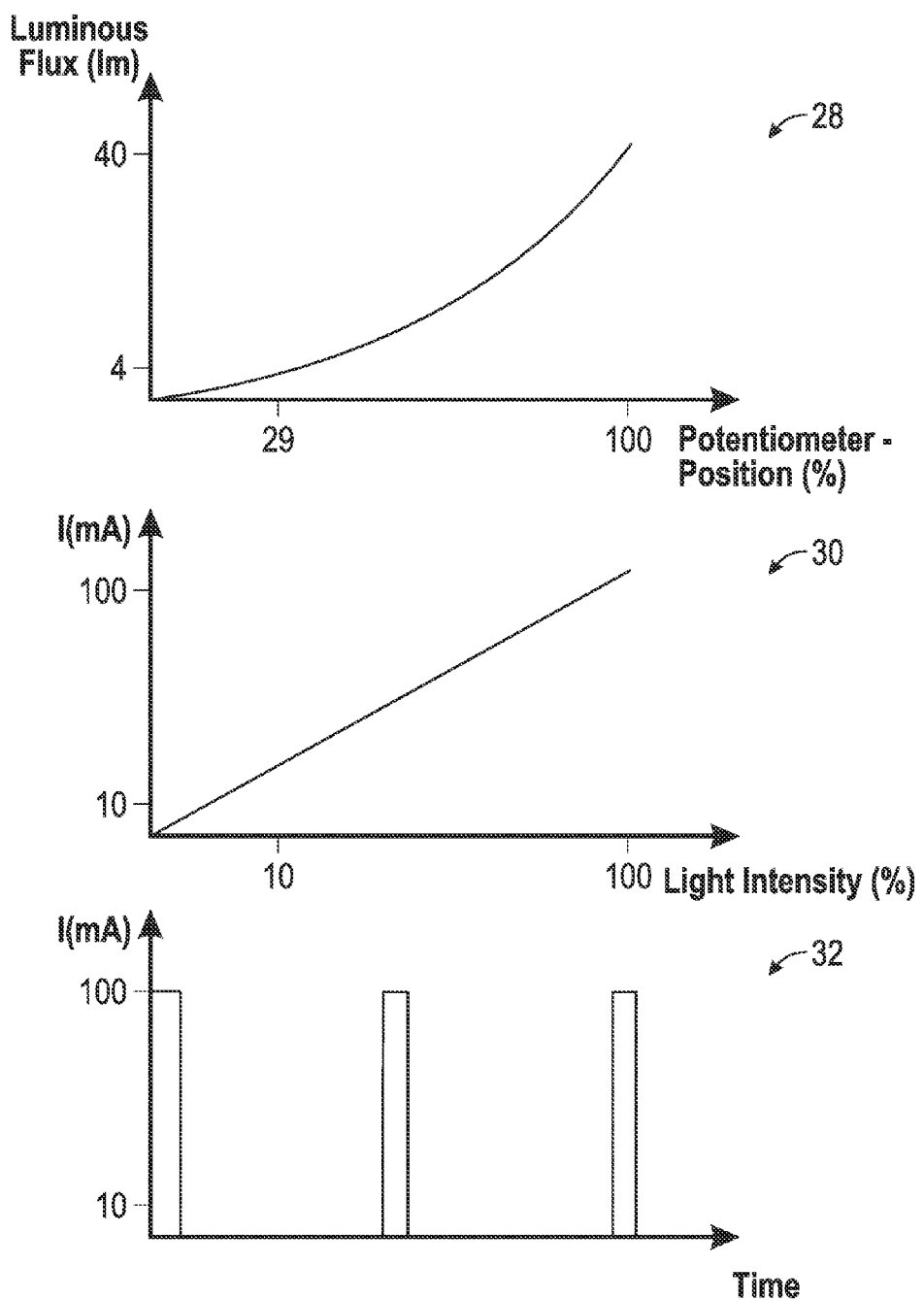
FIG. 3 depicts a first diagram showing the course of a luminous flux over a potentiometer position; a second diagram showing the course of a driving current of an LED over the light intensity of the LED, according to an embodiment using linear driving current control; and a third diagram showing the course of a driving current of an LED over time, according to an embodiment using driving current control with pulse width modulation.

According to the exemplary luminous flux over potentiometer position diagram 28 of FIG. 3, the relationship between the potentiometer position and the luminous flux is not linear for the exemplary LED 18 of the dimmable LED reading light unit 8. A potentiometer position of 29% corresponds to a luminous flux of 4 lumen of the LED 18, whereas a potentiometer position of 100% corresponds to the LED 18 emitting light with a luminous flux of 40 lumen, which is the nominal amount of visible light emitted by the LED 18. The potentiometer position can lie between 0% (off state of the LED 18) and 100% (full brightness of the LED 18).

In order to drive the LED 18 to emit visible light corresponding to 10% of the nominal maximum amount of visible light (40 lumen), either the driving current can be controlled to have an intensity of 10% of the maximum nominal driving current (100 mA), which corresponds in the exemplary diagram 30 to a driving current of 10 mA.

When using pulse width modulation, the duty cycle or duty factor of the driving current of the current controller 16 can be adjusted. On-phases, when nominal driving current of 100 mA is generated, and off-phases, when no driving current is generated, change at fast pace, and the ratio between the on-phases and the off-phases can be adapted by the current controller 16 such that the LED 18 emits light corresponding to the potentiometer position. Diagram 32 depicts a ratio of on-phases and off-phases corresponding to a light intensity of 10% of the LED 18.

At this point let it be said with regard to the embodiments of FIG. 3 that the adjusting of the driving current by the current controller 16 as depicted in FIG. 3 are only two of many possibilities.

While the invention has been described with reference to exemplary embodiments, it will be understood by those skilled in the art that various changes may be made and equivalence may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed, but that the invention will include all the embodiments falling within the scope of the appended claims.

The invention claimed is:

1. A dimmable LED reading light unit, in particular for a passenger transportation vehicle, comprising
   an input for receiving a direct voltage from a potentiometer that outputs the direct voltage having a voltage level corresponding to a selected potentiometer position;
   a load current source which is configured to generate a predetermined load current;
   a current controller providing an operating current for operating at least one LED connected thereto; and
   an electronic measuring and control unit;
   wherein the load current source and the current controller are connected to the input in parallel;
   wherein the electronic measuring and control unit is configured:
      to measure a voltage at the input when no load current is generated by the load current source;
      to drive the load current source to generate the predetermined load current and to measure the voltage at the input when the predetermined load current is generated;
      to determine a determined position of the potentiometer, based on the measured voltages, based on the predetermined load current, and based on a predetermined nominal resistance value of the potentiometer; and
      to control the current controller to supply the operating current to the at least one LED necessary to emit light with a luminous flux corresponding to the determined position of the potentiometer.

2. A dimmable LED reading light unit according to claim 1, wherein the at least one LED comprises two or more series connected LEDs connected to the current controller in series.

3. A dimmable LED reading light unit according to claim 1, wherein the electronic measuring and control unit is configured to periodically switch the load current source between a load current generating state in which the load current source generates a load current and an off-state in which the load current source generates the no load current.

4. A dimmable LED reading light unit according to claim 1, wherein the current controller comprises a controlled current source or a transistor.

5. A dimmable LED reading light unit according to claim 1, wherein the current controller is configured to supply the driving current to the at least one LED necessary to emit light with a luminous flux corresponding to the determined position of the potentiometer, by pulse width modulation.

6. A dimmable LED reading light unit according to claim 1, wherein the current controller is configured to supply the driving current to the at least one LED necessary to emit light with a luminous flux corresponding to the determined position of the potentiometer, by supplying the driving current with a current level corresponding to the determined position of the potentiometer.

7. A dimmable LED reading light unit according to claim 1, further comprising an output connected to a ground line of a power supply system.

8. A dimmable LED reading light unit according to claim 1, further comprising a housing enclosing the load current source, the current controller and the electronic measuring and control unit and fastening the at least one LED.

9. A dimmable LED reading light unit according to claim 1, further comprising the potentiometer, the potentiometer having an input being connectable to a power supply unit supplying a voltage.

10. An arrangement of a power supply unit and a dimmable LED reading light unit for use in a passenger transportation vehicle;
    wherein the dimmable LED reading light unit is a dimmable LED reading light unit according to claim 9; and
    wherein the input of the potentiometer is connected to a first power supply line of the power supply unit and the output of the dimmable LED reading light unit is connected to a second power supply line of the power supply unit.

11. A method of operating a dimmable LED reading light unit in a power supply system, in particular of a passenger transportation vehicle, comprising the steps of:
   (a) supplying a potentiometer and a load current source and a current controller connected in parallel to each other and connected in series to the potentiometer with a constant supply voltage;
   (b) selecting a potentiometer position;
   (c) measuring a voltage, by an electronic measuring and control unit, when no load current is generated by the load current source;
   (d) driving the load current source to generate a predetermined load current and measuring the voltage at the potentiometer, by the electronic measuring and control unit, when the predetermined load current is generated;
   (e) determining a determined position of the potentiometer, based on the measured voltages, based on the load current, and based on a predetermined nominal resistance value of the potentiometer; and
   (f) controlling the current controller, by the electronic measuring and control unit, to supply driving current to at least one LED necessary to emit light with a luminous flux corresponding to the determined position of the potentiometer.

* * * * *